United States Patent
Kim et al.

(10) Patent No.: US 10,224,990 B2
(45) Date of Patent: Mar. 5, 2019

(54) METHOD FOR REPORTING PRECODING MATRIX INDEX FOR HIGH-FREQUENCY BAND COMMUNICATION IN WIRELESS COMMUNICATION SYSTEM, AND APPARATUS THEREFOR

(71) Applicant: LG ELECTRONICS INC., Seoul (KR)

(72) Inventors: Kitae Kim, Seoul (KR); Heejin Kim, Seoul (KR); Kilbom Lee, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 15/321,722

(22) PCT Filed: Jun. 26, 2014

(86) PCT No.: PCT/KR2014/005690
§ 371 (c)(1),
(2) Date: Dec. 22, 2016

(87) PCT Pub. No.: WO2015/199262
PCT Pub. Date: Dec. 30, 2015

(65) Prior Publication Data
US 2017/0141826 A1   May 18, 2017

(51) Int. Cl.
*H04B 7/04*   (2017.01)
*H04W 72/04*  (2009.01)
(Continued)

(52) U.S. Cl.
CPC ......... *H04B 7/0486* (2013.01); *H04B 7/0482* (2013.01); *H04B 7/0639* (2013.01);
(Continued)

(58) Field of Classification Search
CPC . H04W 72/04; H04W 72/0453; H04W 72/06; H04W 88/02; H04W 88/08;
(Continued)

(56) References Cited

U.S. PATENT DOCUMENTS 8,325,841 B2 * 12/2012 Lee ............. H04B 7/0417
375/216
8,351,455 B2 *  1/2013 Tang ............ H04B 7/0626
370/252

(Continued)

FOREIGN PATENT DOCUMENTS

JP   2011518466   6/2011
JP   2012104988   5/2012
(Continued)

OTHER PUBLICATIONS

PCT International Application No. PCT/KR2014/005690, Written Opinion of the International Searching Authority dated Feb. 23, 2015, 19 pages.

(Continued)

*Primary Examiner* — Tri H Phan
(74) *Attorney, Agent, or Firm* — Lee, Hong, Degerman, Kang & Waimey

(57) ABSTRACT

Disclosed in the present application is a method for a terminal reporting a precoding matrix index to a base station in a wireless communication system. Specifically, the method comprises the steps of: estimating a channel with the base station; on the basis of the estimated channel, selecting a first precoding matrix from a first codebook; on the basis of the estimated channel, selecting a second precoding matrix from a second codebook comprising only precoding matrixes which do not include the first precoding matrix;

(Continued)

and reporting, to the base station, at least one among the index of the first precoding matrix and the index of the second precoding matrix.

6 Claims, 8 Drawing Sheets

(51) Int. Cl.
    *H04W 72/06*     (2009.01)
    *H04B 7/0456*     (2017.01)
    *H04B 7/06*     (2006.01)
    *H04W 88/02*     (2009.01)
    *H04W 88/08*     (2009.01)

(52) U.S. Cl.
    CPC ....... *H04W 72/0453* (2013.01); *H04W 72/06* (2013.01); *H04W 88/02* (2013.01); *H04W 88/08* (2013.01)

(58) Field of Classification Search
    CPC ...... H04B 7/04; H04B 7/0417; H04B 7/0482; H04B 7/0486; H04B 7/06; H04B 7/0639
    See application file for complete search history.

(56) References Cited

U.S. PATENT DOCUMENTS

| | | | | |
|---|---|---|---|---|
| 8,555,145 B2* | 10/2013 | Nikopourdeilami | ........................ H03M 7/3088 | |
| | | | | 370/216 |
| 8,611,604 B2* | 12/2013 | Fujiyoshi | ................ G01S 17/89 | |
| | | | | 382/103 |
| 8,625,693 B2* | 1/2014 | Tsai | ..................... H04B 7/0617 | |
| | | | | 375/267 |
| 8,989,115 B2* | 3/2015 | Koo | ...................... H04B 7/0456 | |
| | | | | 370/329 |
| 9,178,598 B2* | 11/2015 | Tomeba | ............... H04B 7/0478 |
| 9,438,327 B2* | 9/2016 | Moulsley | ............... H04B 7/063 |
| 9,680,552 B2* | 6/2017 | Ko | .......... H04B 17/00 |
| 9,813,123 B2* | 11/2017 | Nam | .................... H04B 7/0456 |
| 9,876,553 B2* | 1/2018 | Choi | ................... H04B 7/0639 |
| 2011/0164701 A1 | 7/2011 | Nikopourdeilami et al. | | |
| 2012/0113830 A1* | 5/2012 | Zhu | ....................... H04B 7/024 | |
| | | | | 370/252 |
| 2012/0314590 A1 | 12/2012 | Choudhury et al. | | |
| 2013/0083743 A1 | 4/2013 | Koo et al. | | |
| 2014/0133471 A1 | 5/2014 | Nammi et al. | | |

FOREIGN PATENT DOCUMENTS

| | | |
|---|---|---|
| KR | 1020090101405 | 9/2009 |
| KR | 1020120086286 | 8/2012 |
| KR | 1020120123497 | 11/2012 |

OTHER PUBLICATIONS

European Patent Office Application Serial No. 14895790.5, Search Report dated Feb. 20, 2018, 11 pages.

Kakishima, Y. et al., "System-Level Evaluation on Enhanced 4-Tx Codebook for LTE-Advanced Downlink Multi-User MIMO", vol. 113 No. 385, Jan. 2014, 7 pages.

\* cited by examiner

FIG. 10

| Codebook index | $u_n$ | Number of layers $\upsilon$ | | | |
|---|---|---|---|---|---|
| | | 1 | 2 | 3 | 4 |
| 0 | $u_0 = \begin{bmatrix} 1 & -1 & -1 & -1 \end{bmatrix}^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = \begin{bmatrix} 1 & -j & 1 & j \end{bmatrix}^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = \begin{bmatrix} 1 & 1 & -1 & 1 \end{bmatrix}^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = \begin{bmatrix} 1 & j & 1 & -j \end{bmatrix}^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = \begin{bmatrix} 1 & (-1-j)/\sqrt{2} & -j & (1-j)/\sqrt{2} \end{bmatrix}^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = \begin{bmatrix} 1 & (1-j)/\sqrt{2} & j & (-1-j)/\sqrt{2} \end{bmatrix}^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = \begin{bmatrix} 1 & (1+j)/\sqrt{2} & -j & (-1+j)/\sqrt{2} \end{bmatrix}^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = \begin{bmatrix} 1 & (-1+j)/\sqrt{2} & j & (1+j)/\sqrt{2} \end{bmatrix}^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = \begin{bmatrix} 1 & -1 & 1 & 1 \end{bmatrix}^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = \begin{bmatrix} 1 & -j & -1 & -j \end{bmatrix}^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = \begin{bmatrix} 1 & 1 & 1 & -1 \end{bmatrix}^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = \begin{bmatrix} 1 & j & -1 & j \end{bmatrix}^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = \begin{bmatrix} 1 & -1 & -1 & 1 \end{bmatrix}^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = \begin{bmatrix} 1 & -1 & 1 & -1 \end{bmatrix}^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = \begin{bmatrix} 1 & 1 & -1 & -1 \end{bmatrix}^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = \begin{bmatrix} 1 & 1 & 1 & 1 \end{bmatrix}^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Type-1 codebook

Excluded region

Type-2 codebook
Search space

FIG. 11

| Number of Rank(=layers) = $N_s$ |||||||||
|---|---|---|---|---|---|---|---|
| 1 || 2 || 3 || 4 ||
| PMI index | Codebook | PMI index | Codebook | PMI index | Codebook | PMI index | Codebook |
| $P_1$ | $\left[w_0^{(1)}\right]$ | $P_5$ | $\left[w_0^{(1)} w_0^{(2)}\right]$ | $P_{11}$ | $\left[w_0^{(1)} w_0^{(2)} w_0^{(3)}\right]$ | $P_{15}$ | $\left[w_0^{(1)} w_0^{(2)} w_0^{(3)} w_0^{(4)}\right]$ |
| $P_2$ | $\left[w_0^{(2)}\right]$ | $P_6$ | $\left[w_0^{(1)} w_0^{(3)}\right]$ | $P_{12}$ | $\left[w_0^{(1)} w_0^{(2)} w_0^{(4)}\right]$ | | ... |
| $P_3$ | $\left[w_0^{(3)}\right]$ | $P_7$ | $\left[w_0^{(1)} w_0^{(4)}\right]$ | $P_{13}$ | $\left[w_0^{(1)} w_0^{(3)} w_0^{(4)}\right]$ | | |
| $P_4$ | $\left[w_0^{(4)}\right]$ | $P_8$ | $\left[w_0^{(2)} w_0^{(3)}\right]$ | $P_{14}$ | $\left[w_0^{(2)} w_0^{(3)} w_0^{(4)}\right]$ | | |
| | ... | $P_9$ | $\left[w_0^{(2)} w_0^{(4)}\right]$ | | ... | | |
| | | $P_{10}$ | $\left[w_0^{(3)} w_0^{(4)}\right]$ | | | | |
| | | | ... | | | | |

FIG. 12

| Codebook index | $u_n$ | Number of layers $\upsilon$ | | | |
|---|---|---|---|---|---|
| | | 1 | 2 | 3 | 4 |
| 0 | $u_0 = \begin{bmatrix} 1 & -1 & -1 & -1 \end{bmatrix}^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = \begin{bmatrix} 1 & -j & 1 & j \end{bmatrix}^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = \begin{bmatrix} 1 & 1 & -1 & 1 \end{bmatrix}^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = \begin{bmatrix} 1 & j & 1 & -j \end{bmatrix}^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = \begin{bmatrix} 1 & (-1-j)/\sqrt{2} & -j & (1-j)/\sqrt{2} \end{bmatrix}^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = \begin{bmatrix} 1 & (1-j)/\sqrt{2} & j & (-1-j)/\sqrt{2} \end{bmatrix}^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = \begin{bmatrix} 1 & (1+j)/\sqrt{2} & -j & (-1+j)/\sqrt{2} \end{bmatrix}^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = \begin{bmatrix} 1 & (-1+j)/\sqrt{2} & j & (1+j)/\sqrt{2} \end{bmatrix}^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = \begin{bmatrix} 1 & -1 & 1 & 1 \end{bmatrix}^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = \begin{bmatrix} 1 & -j & -1 & -j \end{bmatrix}^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = \begin{bmatrix} 1 & 1 & 1 & -1 \end{bmatrix}^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = \begin{bmatrix} 1 & j & -1 & j \end{bmatrix}^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = \begin{bmatrix} 1 & -1 & -1 & 1 \end{bmatrix}^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = \begin{bmatrix} 1 & -1 & 1 & -1 \end{bmatrix}^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = \begin{bmatrix} 1 & 1 & -1 & -1 \end{bmatrix}^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = \begin{bmatrix} 1 & 1 & 1 & 1 \end{bmatrix}^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Type-1 codebook

Type-2 codebook Search space

Excluded region

METHOD FOR REPORTING PRECODING MATRIX INDEX FOR HIGH-FREQUENCY BAND COMMUNICATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/005690, filed on Jun. 26, 2014, the contents of which are hereby incorporated by reference herein in its entirety.

TECHNICAL FIELD

The present invention relates to a wireless communication system, and more particularly, to a method of reporting a precoding matrix index for high-frequency band communication in a wireless communication system and apparatus therefor.

BACKGROUND ART

A legacy beamforming technique using multiple antennas can be mainly classified into an analog beamforming technique and a digital beamforming technique depending on a location to which a beamforming weight vector/precoding vector is applied.

First of all, the analog beamforming technique is a typical beamforming technique applied to an initial multi-antenna structure. The analog beamforming technique divides an analog signal of which digital signal processing is completed into a plurality of paths and sets phase-shift (PS) and power amplification (PA) to each of a plurality of the paths to perform beamforming. FIG. 1 is a diagram for an example of a legacy analog beamforming technique.

Referring to FIG. 1, it is able to see a structure that an analog signal derived from a single digital signal is processed by a power amplifier and a phase shifter connected to each antenna to perform analog beamforming. In particular, the phase shifter and the power amplifier process complex weights at an analog stage. In this case, a radio frequency (RF) chain corresponds to a processing block in which a single digital signal is converted into an analog signal.

However, according to the analog beamforming technique, since accuracy of a beam is determined according to characteristics of elements of the phase shifter and the power amplifier, the analog beamforming technique is advantageous for the narrow band transmission due to the control characteristics of the elements. On the other hand, since the analog beamforming technique has a hardware structure incapable of implementing multi-stream transmission, multiplexing gain for increasing a transmission rate is relatively small and it is difficult to perform beamforming per user based on orthogonal resource allocation.

Unlike the analog beamforming technique, the digital beamforming technique performs beamforming at a digital stage using a baseband process to maximize diversity and multiplexing gain in MIMO environment.

Referring to FIG. 2, digital beamforming can be performed by performing precoding in a baseband process. Unlike FIG. 1, an RF chain includes a power amplifier. This is because a complex weight derived for beamforming is directly applied to a transmission data.

And, since the digital beamforming technique is able to differently perform beamforming according to a user, it is able to support multi user beamforming at the same time. Since the digital beamforming technique is able to perform independent beamforming according to a user to which an orthogonal resource is allocated, the digital beamforming technique has characteristics that scheduling flexibility is high and it is able to manage a transmitting end in accordance with a system purpose. Moreover, when a technique such as Multiple-Input Multiple-Output (MIMO)-OFDM (Orthogonal Frequency Division Multiplexing) is applied in a broadband transmission environment, it may form an independent beam for each subcarrier. Therefore, the digital beamforming technique can maximize the maximum transmission rate of a single user based on increased system capacity and enhanced beam gain.

In accordance with the aforementioned advantages and disadvantages, digital beamforming-based MIMO technology has been introduced in the current 3G/4G system.

DISCLOSURE OF THE INVENTION

Technical Task

Based on the aforementioned discussion, the technical task of the present invention is to propose a method of reporting a precoding matrix index for high-frequency band communication in a wireless communication system and apparatus therefor.

Technical Solutions

In one technical aspect of the present invention, provided herein is a method of reporting a precoding matrix index to a base station from a user equipment in a wireless communication system, including estimating a channel with the base station, selecting a first precoding matrix from a first codebook based on the estimated channel, selecting a second precoding matrix from a second codebook including precoding matrixes failing to include the first precoding matrix based on the estimated channel, and reporting at least one of an index of the first precoding matrix and an index of the second precoding matrix to the base station.

In another technical aspect of the present invention, provided herein is a method of reporting a precoding matrix index to a base station from a user equipment in a wireless communication system, including estimating a channel with the base station, selecting a first precoding matrix from a first codebook based on the estimated channel, selecting a second precoding matrix from a second codebook including high-rank precoding matrixes including the first precoding matrix based on the estimated channel, and reporting at least one of an index of the first precoding matrix and an index of the second precoding matrix to the base station.

Particularly, if sending a signal to the user equipment using the second precoding matrix, the base station may apply precoding by excluding the first precoding matrix from the second precoding matrix. In doing so, if the base station sends a signal to the user equipment using the second precoding matrix, a rank of the signal may include a value resulting from subtracting a rank of the first precoding matrix from a rank corresponding to the second precoding matrix.

According to the above embodiments, the first precoding matrix is preferably provided for a rank-1 transmission. More preferably, the first precoding matrix may be provided for a LoS (Line of Sight) path of the channel and the second precoding matrix may be provided for an NLoS (Non-LoS) path of the channel.

More preferably, the selecting the first precoding matrix and the selecting the second precoding matrix may include selecting a precoding matrix maximizing capacity of the channel.

Advantageous Effects

According to an embodiment of the present invention, a precoding matrix index can be efficiently reported in a high-frequency band transmission.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 10 shows one example of deriving type-1 PMI and type-2 PMI from a codebook of a nested structure according to an embodiment of the present invention.

FIG. 11 shows another example of selecting type-1 PMI and type-2 PMI from an existing codebook according to an embodiment of the present invention.

FIG. 12 shows another example of deriving type-1 PMI and type-2 PMI from a codebook of a nested structure according to an embodiment of the present invention.

BEST MODE FOR INVENTION

The configuration, operation and other features of the present invention will be understood by the embodiments of the present invention described with reference to the accompanying drawings.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
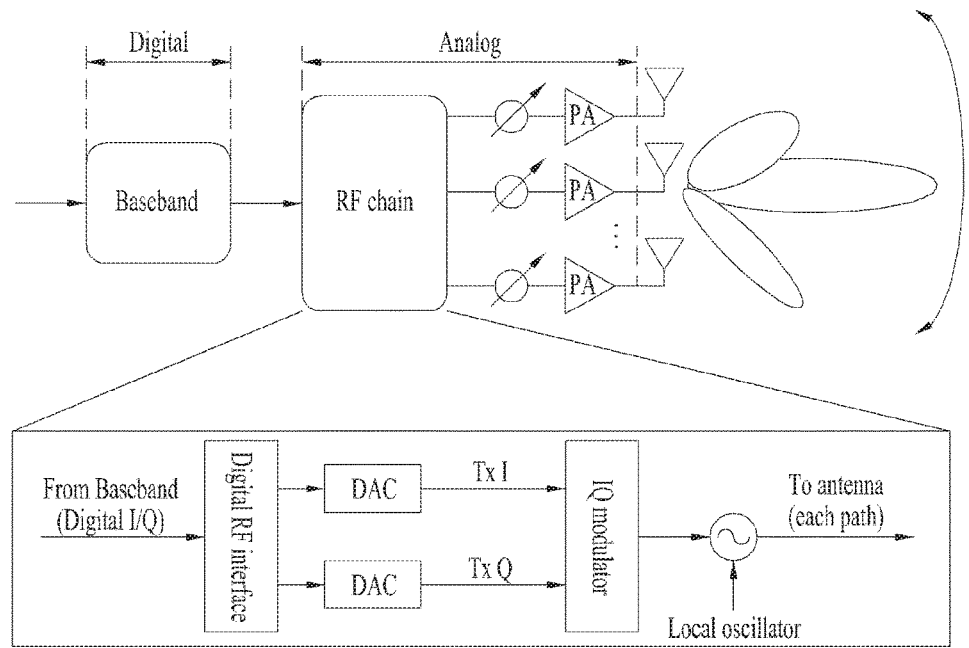
FIG. 1 is a diagram for an example of a legacy analog beamforming technique.
Figure 2:
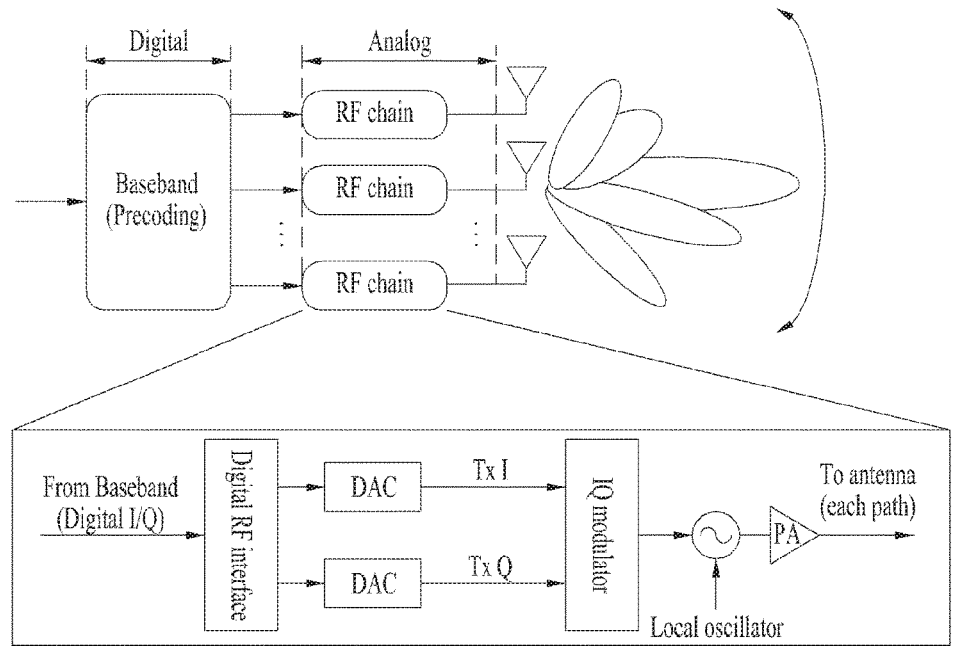
FIG. 2 is a diagram for an example of a legacy digital beamforming technique.
Figure 3:
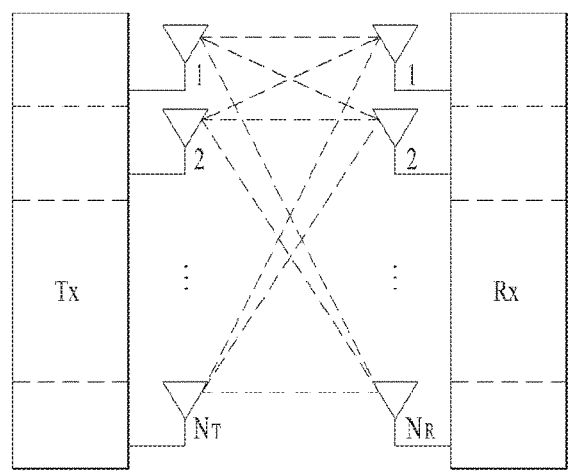
FIG. 3 is a diagram showing the configuration of a general multiple input multiple output (MIMO) system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \quad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, Ŝ may be expressed using a diagonal matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the NT actually transmitted signals $x_1, x_2, \ldots x_{N_T}$ are configured by applying a weight matrix W to the information vector Ŝ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. Wij denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

rank(*H*)≤min(*N_T*,*N_R*)   [Equation 6]

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

\# of streams≤rank(*H*)≤min(*N_T*,*N_R*)   [Equation 7]

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

In the following, a massive MIMO environment in which the number of transmission and reception antennas is considerably increased is explained. In general, in cellular communication, it is assumed that maximum 8 transmission/reception antennas are applied to a MIMO environment. However, as evolving into massive MIMO, the number of antennas may increase more than dozens or several hundreds of antennas.

If a digital beamforming technique is applied in a massive MIMO environment, since it is necessary to perform signal processing on hundreds of antennas for digital signal processing of a transmitting end through a baseband process, signal processing complexity becomes very complex and hardware implementation complexity becomes very complex because RF chains as many as the number of antennas are necessary. In addition, since it is necessary to perform independent channel estimation on all antennas and have feedback information on a huge MIMO channel consisting of all antennas in case of a FDD (frequency division duplex) system, a pilot and a feedback overhead become very big. On the other hand, if an analog beamforming technique is applied in the massive MIMO environment, hardware complexity of a transmitting end is relatively low, but performance enhancement using multiple antennas is insignificant and flexibility of resource allocation is degraded. In particular, in case of performing broadband transmission, it is very difficult to control a beam according to a frequency.

Therefore, in the massive MIMO environment, it is necessary to have a scheme of configuring a transmitting end of a hybrid type that an analog beamforming structure and a digital beamforming structure are combined instead of exclusively selecting one of the analog beamforming and the digital beamforming techniques Table 1 in the following shows relationship between a performance gain and complexity of the analog beamforming technique and the digital beamforming technique. It is necessary to design a structure of a transmitting end of a hybrid type capable of reducing the hardware implementation complexity of the transmitting end and maximizing a beamforming gain using the massive antenna based on the relationship.

TABLE 1

| | Easy of beamforming accuracy control | Multicarrier beam control | Multistream transmission | Hardware complexity (BB process) | Pilot and feedback overhead |
|---|---|---|---|---|---|
| Analog beamforming technique | low | impossible or difficult | impossible or difficult | low | low |
| Digital beamforming technique | high | possible | possible | high | high |

In the following, hybrid beamforming is explained in more detail.

Figure 4:
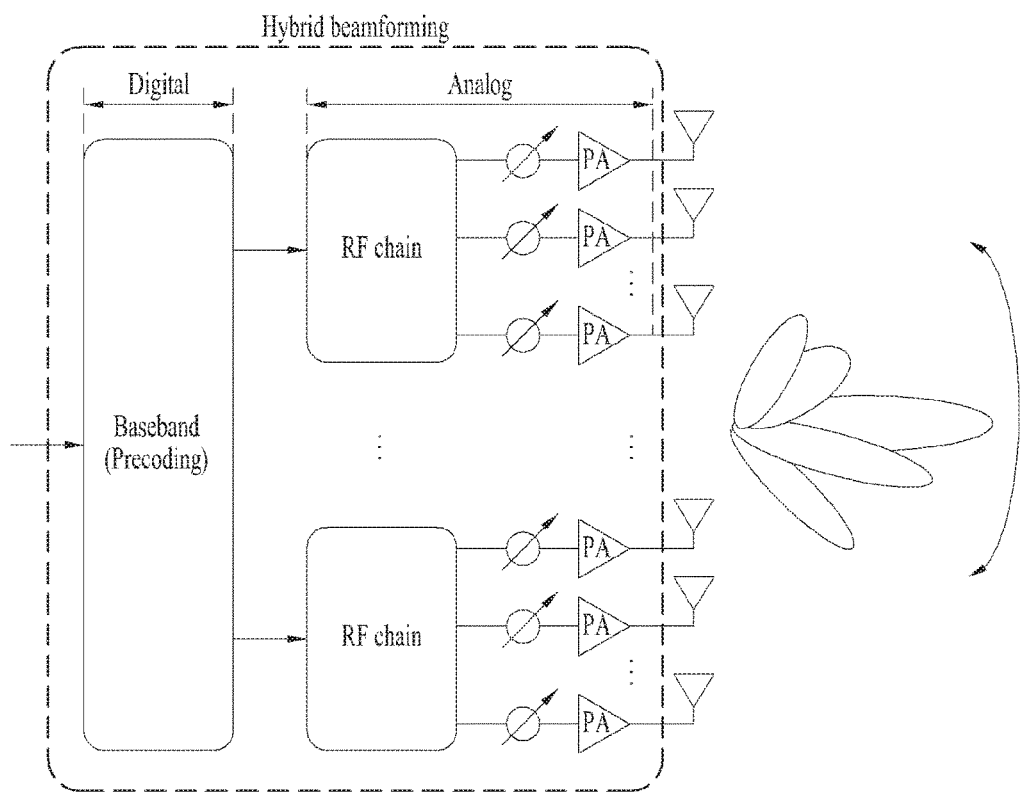
FIG. 4 is a diagram for explaining a concept of hybrid beamforming.

The hybrid beamforming is performed to configure a transmitting end capable of reducing hardware complexity and achieving characteristics of the analog beamforming technique and advantages of the digital beamforming technique. FIG. 4 is a diagram for explaining a concept of hybrid beamforming.

Referring to FIG. 4, the hybrid beamforming is a structure that performs coarse beamforming using the analog beamforming technique and performs multi-stream or multi-user transmission using the digital beamforming technique. Consequently, the hybrid beamforming has a structure for simultaneously performing the analog beamforming technique and the digital beamforming technique to lower implementation complexity of a transmitting end or hardware complexity. Basically, technical issues of the hybrid beamforming are described in the following.

Optimization considering both analog and digital beamforming at the same time has the following difficulties. Basically, the digital beamforming has an identical time-frequency resource and can apply an independent beamforming technique to each user. On the contrary, the analog beamforming has a limitation that it is necessary to apply a common beamforming technique with an identical time-frequency resource. Hence, the limitation causes such an optimization constraint as the number of supported ranks, beam control flexibility, beamforming decomposition, and the like.
  The analog beamforming technique, which forms a beam only in a specific direction in the same time-frequency resource, is unable to perform multiple beamforming in all UEs directions at the same time. Hence, there is a problem that it is impossible to simultaneously transmit a UL/DL control channel, a reference signal, a synchronization signal, and the like to all UEs capable of being distributed to all areas of a cell.
  In case of performing estimation on an analog/digital beam, although the digital beam is able to use a legacy orthogonal pilot allocation scheme as it is, the analog beam requires a predetermined time-duration as many as the number of beam candidates. This means that time delay required for the analog beam estimation is not small. And, if the analog beam and the digital beam are estimated at the same time, complexity can be considerably increased.
  Lastly, while the digital beamforming technique is able to easily perform beamforming for multi-user/stream, the analog beamforming technique performs same beamforming on the entire transmission band. Hence, it is difficult to perform independent beamforming according to a user or a stream. In particular, since it is difficult to support FDMA (e.g., OFDMA) through orthogonal frequency resource allocation, it may be difficult to achieve optimization of frequency resource efficiency.

In the following, mmWave (millimiter-wave), which is a field to which the present invention is mainly applied, is explained.

Figure 5:
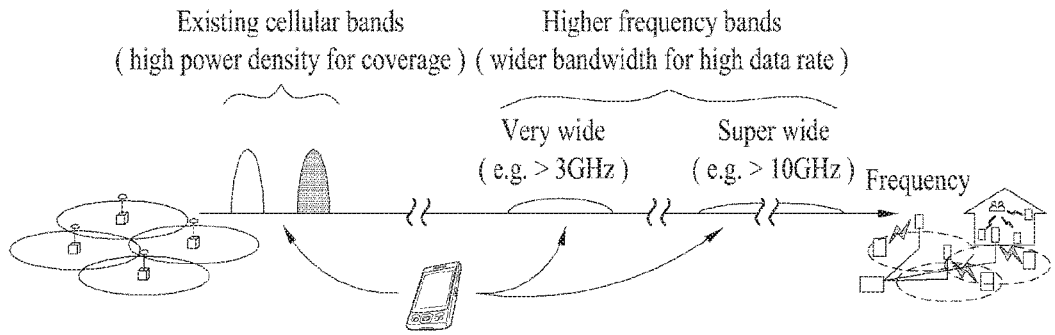
FIG. 5 is a conceptual diagram for next generation frequency domain allocation through high frequency band securement.

FIG. 5 is a conceptual diagram for next generation frequency domain allocation through high frequency band securement.

In the next generation 5G communication system, a new spectrum is being considered to achieve a transmission rate of dozens of Gbps. For example, as shown in FIG. 5, an mmWave band using a center frequency of dozens of GHz rather than a legacy cellular band is considered as one of the strongest candidate bands.

Since the mmWave band has a center frequency higher than a legacy 2 GHz cellular band, a higher path loss occurs in the mmWave band. Equation 8 in the following shows a path loss in a high frequency environment.

$$P_{RA}(d) = P_t + G_t + G_r - 32.44 - 20 \log_{10}(f_{c,GHz} \cdot d_m) - L_{exv}$$ [Equation 8]

Referring to Equation 8, it is able to see that, if a center frequency is increased to dozens of GHz compared to a legacy 2 GHz band, a path loss of dozens of dB additionally occurs. In addition, in case of a high frequency band, environment loss additionally occurs according to humidity of the atmosphere, dust, precipitation, and weather condition. A parameter for representing the loss corresponds to $L_{exv}$. The parameter has a range approximately ranging from 4 dB to 40 dB.

Figure 6:
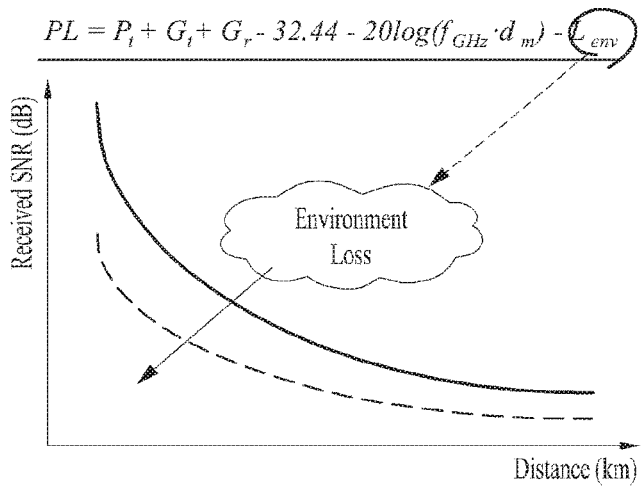
FIG. 6 is a conceptual diagram for the increase of the total path loss which occurs due to an additional environment loss in high frequency environment.

FIG. 6 is a conceptual diagram for the increase of the total path loss which occurs due to an additional environment loss in high frequency environment.

Referring to FIG. 6, it is able to see that the mmWave band has an additional path loss in a high frequency band compared to a legacy commercial cellular band. In particular, on the basis of a base station having a limited transmit power, in order for a UE to secure stable reception capability, a small cell having small service coverage may become a suitable cell deployment scenario.

An additional small unit characteristic of the mmWave band can be mainly divided into a delay spread and a Doppler frequency change. In the mmWave band, it is able to examine that multi-path caused by multipath delay becomes shorter compared to a legacy commercial frequency band. In addition, the last path delay of the multi-path does not exceed 500 ns.

In a general cellar system, maximum delay is 5 us on the basis of LTE system. Table 2 in the following shows that RMS (Root Mean Square) delay spread is about 134.57 ns which has been significantly lowed compared to the legacy cellular band. Table 2 shows propagation characteristics of the mmWave band. Since the mmWave band has a wider coherence bandwidth compared to the legacy commercial band, it is able to anticipate that a channel is going to be static in a bigger unit in frequency domain.

TABLE 2

| Characteristic | Urban1 | Urban2 | Suburban | Rural |
| --- | --- | --- | --- | --- |
| lcr_10dB | 3.22 | 2.1 | 3.78 | 3.36 |
| afd_10dB | 0.015 | 0.014 | 0.015 | 0.015 |
| Mean Delay (ns) | 70.41 | 48.08 | 46.41 | 45.41 |
| Delay Spread (ns) | 134.57 | 30.32 | 12.75 | 9.05 |
| ConBW (MHz) | 5.0 | 9.46 | 14.0 | 14.91 |
| K-Factor (dB) | 10.13 | 10.38 | 14.28 | 14.86 |

Figure 7:
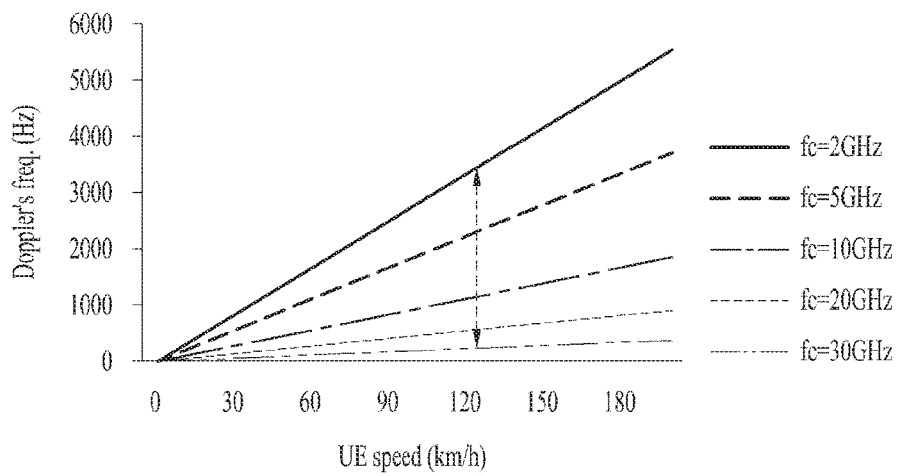
FIG. 7 is a diagram for Doppler's frequency according to moving speed of UE and center frequency.

Lastly, the mmWave band has time-varying channel characteristic for a Doppler frequency larger than that of the legacy commercial band. The Doppler frequency according to a center frequency and moving speed of a UE can be represented by equation 9 in the following. FIG. 7 is a diagram for Doppler frequency according to moving speed of UE and a center frequency.

$$f_{d,max} = \frac{v \cdot f_c}{c}$$ [Equation 9]

Referring to equation 9 and FIG. 7, it is able to see that the Doppler frequency is significantly increasing according to the increase of the center frequency under the same moving speed of a UE. Although the UE moves slowly, the Doppler frequency is considerably increased in the mmWava band. Hence, it is able to see that time-varying characteristic of a channel increases as well.

Communication performed on the mmWave band corresponds to communication using a relatively high center frequency as wide as dozens of GHz and has a characteristic that a path loss is greater than that of a legacy cellular system using a central frequency equal to or narrower than 3 GHz. In particular, since signal power attenuation equal to or greater than dozens of dB occurs between LoS (Line of Sight) and NLoS (Non-LoS) path in the mmWave band communication, if LoS/NLoS path is rapidly changed, a communication link can be disconnected.

In order to compare path-loss according to the LoS path with path-loss according to the NLoS path of the mmWave band, it may use equation 10 in the following.

$$PL(d) = PL_{free}(d_0) + 10 \cdot n \cdot \log_{10}\left(\frac{d}{d_0}\right) \quad \text{[Equation 10]}$$

Figures 8, 9:
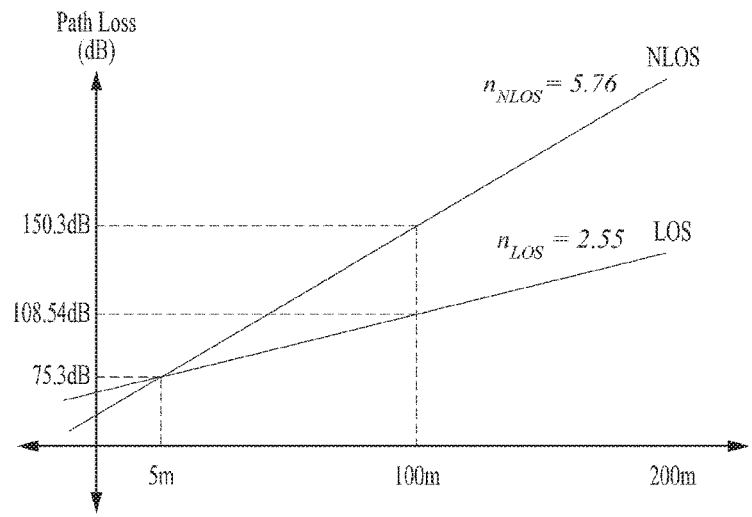
FIG. 8 is a graph indicating a path loss according to a path attenuation index of LoS/NLoS.
FIG. 9 shows one example of selecting type-1 PMI and type-2 PMI from an existing codebook according to an embodiment of the present invention.

In Equation (10), free space path attenuation, a path attenuation index, and a path loss according to a distance are shown only except transmission/reception antenna gain, an attenuation component according to a center frequency, and the like. In general, path attenuation of NLoS is greater than path attenuation of LoS and a difference between the path attenuation of NLoS and the path attenuation of LoS increases as getting close to a high frequency band such as the mmWave band. FIG. 8 is a graph indicating a path loss according to a path attenuation index of LoS/NLoS.

In general, the mmWave band considers a service coverage smaller than a service coverage of a legacy low frequency cellular band. Hence, it is necessary to analyze path loss due to LoS/NLoS in a dense urban scenario. If it is assumed that a path attenuation index is obtained as $n_{LOS}$=2.55, $n_{NLOS}$=5.76 through measurement-based channel modelling in the general 28 GHz mmWave band, it can be predicted that a difference between LoS path loss and NLoS path loss theoretically occurs as much as about 40 dB near 100 m from a base station. Hence, if a rapid link change occurs between LoS and NLoS due to a sudden shadowing in the dense urban communication environment, since it is unable to secure link quality due to a path attenuation difference, continuity of communication may not be guaranteed.

As mentioned in the foregoing description, in the mmWave band, path loss varies depending on the LoS/NLoS path. This is because, since a path loss index of a reflection wave is big on a high frequency band, such a relationship as $n_{NLOS} \gg n_{LOS}$ is established in general. And, due to the characteristics of the mmWave band, among the multipath channels, the number of meaningful paths capable of maintaining stable communication is limited.

Therefore, it is able to anticipate that a radio channel is also valid for a specific path only in the environment. In particular, if a radio channel of the mmWave band is decomposed, it is able to see that a channel gain is concentrated on a specific space. For example, equation 11 in the following shows that SVD (singular value decomposition) is performed on a radio channel H of size $N_r \times N_t$.

$$H = U\Sigma V^H \quad \text{[Equation 11]}$$

Referring to equation 11, a radio channel H having a size of $N_r \times N_t$ is decomposed into an input singular matrix U corresponding to a unitary matrix having a size of $N_r \times N_r$, an output singular matrix V corresponding to a unitary matrix having a size of $N_t \times N_t$, and a diagonal matrix $\Sigma$ having a size of $N_r \times N_t$ that has Eigen values as diagonal components. In this case, the $\Sigma$ is represented as equation 12 in the following. In general, it is assumed that the number of transmission antennas is greater than the number of reception antennas in a massive MIMO system.

$$\Sigma = [\Sigma_1 \quad O] = \begin{bmatrix} \sigma_1 & & & \\ & \sigma_2 & & \\ & & \ddots & O \\ & & & \sigma_{N_r} \end{bmatrix} \quad \text{[Equation 12]}$$

In this case, due to the multipath characteristic of the mmWave, there is a limit in generating an independent parallel channel. In this case, a channel of LoS path having a greatest channel gain and a part of NLoS path having a low channel gain can be generated as independent parallel channels. Due to the characteristic, each Eigen value may have relationship shown in equation 13 in the following.

$$\underbrace{\sigma_1}_{Los} \gg \underbrace{\sigma_2 > \sigma_3 > \sigma_4}_{Nlos} = \sigma_5 = \ldots = 0 \quad \text{[Equation 13]}$$

As a result, although most part of a channel gain is concentrated on a first Eigen value, at least second and third Eigen value may also have a meaningful channel gain for communication. Hence, it is able to assume that the mmWave corresponds to environment in which a single LoS channel having a big channel gain and one or two NLoS parallel channels having a relatively small channel gain are formed at least. Consequently, it may assume that such a relationship as equation 14 in the following is established between a channel gain and an Eigen value.

$$\|H\|^2 \approx \sigma_1^2 + \sigma_2^2 + \sigma_3^2 \quad \text{[Equation 14]}$$

In this case, if a communication environment includes a sudden shadowing variation, the environment can be interpreted as an environment in which a LoS path among LoS and NLoS channels appears or disappears due to such an obstacle as a building or the like. Consequently, it indicates that a channel having a first Eigen value is rapidly generated or disappeared. And, in the mmWave band, since a big path loss difference as much as about 40 dB may occur between LoS and NLoS on the basis of 100 m service coverage, if a relatively good channel suddenly disappears, communication can be disconnected. Therefore, it is necessary to have a method capable of maintaining stable communication of a certain level while overcoming the loss of LoS/NLoS path.

The present invention proposes a beamforming technique capable of providing stable communication continuity while relatively lowering communication quality degradation due to sudden shadowing based on information on an NLoS path which is not suddenly changed by an obstacle.

<First Embodiment>

If SVD based beamforming is performed in consideration of the radio channel H shown in Formula 11, the SVD based beamforming may be represented as Formula 15 in the following.

$$U^H y = U^H HFx + U^H n \quad \text{[Formula 15]}$$

In Formula 15, a precoder F has a size of $N_t \times N_s$ as a V vector and $U^H$ indicates a postcoder. In Formula 15, y is a received signal vector in size of $N_r \times 1$ and x indicates a transmitted signal vector in size of $N_s \times 1$. And, $N_s$ means the number of multiple streams.

Herein, if it is impossible for a base station to obtain a channel using TDD (Time Division Duplex) system based channel symmetry (reciprocity), a user equipment should feed back a matrix or vector $V^H$ obtained from a given channel to the base station.

According to the present proposal, proposed is a method of overcoming a rapid shadowing change by performing beamforming using a previously defined precoding matrix. Namely, according to a first embodiment of the present invention, a user equipment is proposed to perform channel regeneration in consideration of communication quality degradation due to rapid shadowing and derive precoding (PMI) and rank (RI) information using an existing codebook for a regenerated channel.

First of all, in order to derive a PMI for a channel of LoS path and a PMI (precoding matrix index) of NLoS path based on a predefined codebook $\{P_1, P_2, P_3, \ldots, P_L\}$, a type-1 PMI for maximizing a channel gain is derived using an existing channel as it is according to Formula 16. Herein, the type-1 PMI indicates a PMI for a channel of LoS path.

$$G_1 = \arg\max_{i=1,\ldots,L} \|HP_i\| \quad \text{[Formula 16]}$$

Secondly, a PMI for maximizing a channel gain is derived according to Formula 18 by modifying an existing channel according to Formula 17.

$$H = U\Sigma V^H \rightarrow \Sigma = \begin{bmatrix} \sigma_1 & & & \\ & \sigma_2 & & \\ & & \ddots & O \\ & & & \sigma_{N_r} \end{bmatrix} \rightarrow$$

$$\Sigma' = \begin{bmatrix} 0 & & & \\ & \sigma_2 & & \\ & & \ddots & O \\ & & & \sigma_{N_r} \end{bmatrix} \rightarrow U\Sigma'V^H \rightarrow \hat{H}$$

[Formula 17]

$$G_2 = \arg\max_{i=1,\ldots,L} \|\hat{H}P_i\| \quad \text{[Formula 18]}$$

Looking into Formula 17, since a part corresponding to LoS component has a biggest channel gain, it can be observed that a valid channel $\hat{H}$ is regenerated by eliminating a biggest eigen value. Yet, although $\sigma_1$ is eliminated in Formula 17, it is just one example. And, it is a matter of course that a weight close to 0 can be given. The PMI derived according to Formula 18 is named a type-2 PMI, which is a PMI for a channel of NLoS path.

Meanwhile, although a user equipment can feed back both a type-1 PMI and a type-2 PMI to a base station, it may be able to change a feedback period according to OMI type. For instance, a type-1 PMI for Los path is fed back by long-term periods and a type-2 PMI for NLoS path is fed back by short-term periods.

And, the user equipment may feed back a variation of a reception performance by the type-1 PMI to the base station. In particular, if UE reception performance varies on LoS path that is the most robust path, it can be assumed as a situation that a rapid shadowing change occurs. Hence, the user equipment estimates a variation of a reception performance and then feeds back it to the base station, thereby enabling the base station to perform a beam change appropriate for the rapid shadowing change occurring situation. In doing so, although various estimation values are usable as a measure of the derived reception performance, a representative value is a received SNR. The feedback based on the received SNR estimated by the user equipment includes 1) to 4) in the following. Through such information, the base station can determine whether to maintain the type-1 PMI based beamforming.

1) SNR variance or standard deviation during specific time interval (cf Formula 19).

$$\frac{1}{T} \sum_{t=T_0}^{T_0+T-1} (SNR_t - E\{SNR\})^2 \quad \text{[Formula 19]}$$

Yet, $E\{SNR\} = \frac{1}{T} \sum_{t=T_0}^{T_0+T-1} SNR_t$ or $$E\{SNR\} = \frac{1}{T_0+T-1} \sum_{t=1}^{T_0+T-1} SNR_t, t$$

is measurement time t: measurement time index, $T_0$: measurement start time, T: measurement duration 2) SNR variation during specific time interval (cf. Formula 20)

$$|SNR_{T_1} - SNR_{T_0}| \quad \text{[Formula 20]}$$

Yet, $T_0$: reference time, $T_1$: reporting time

3) Weight applied SNR variation (cf. Formula 21)

$$\left| \sum_{t=T_0+1}^{T_1} w_t (SNR_t - SNR_{t-1}) \right| \quad \text{[Formula 21]}$$

Yet, $w_t$ is a weight at time t

4) Variation of SNR average (cf. Formula 22)

$$\frac{1}{T} \left| \sum_{t=T_2}^{T_2+T-1} SNR_t - \sum_{t=T_0}^{T_0+T-1} SNR_t \right| \quad \text{[Formula 22]}$$

Yet, $T_2 + T - 1 = R$ reporting time $(T_1)$

Of course, a variation estimated value of channel capacity, throughput, CQI, or MCS (modulation and coding scheme) can be utilized as feedback information as well as the SNR in 1) to 4). In addition, when the reception performance variation by the type-1 PMI is measured/reported, the type-1 PMI is reselected with reference to rank 1 without channel regeneration and a reception performance variation corresponding to the corresponding value can be measured/reported.

Preferably, if the reception performance variation by the type-1 PMI, which is fed back from the user equipment, is equal to or greater than a specific reference value, the base station may determine it as a rapid shadowing change occurring situation and then operate to perform beamforming using the type-2 PMI.

Namely, it means that the base station performs the beamforming using the type-2 PMI by avoiding the type-1 PMI affected by the rapid shadowing change. For instance, if a received SNR variation of the beamforming using the type-1 PMI becomes equal to or greater than a reference value, the base station performs a process for changing into the beamforming using the type-2 PMI.

Additionally, the base station defines the type-2 PMI based beamforming as a basic mode and may be then defined to use the type-1 PMI only if a rapid shadowing change does not occur in a link to the user equipment.

In order for the base station to measure the reception performance variation, it may be able to make a determination with reference to an uplink quality change or a variation of a reception quality information (e.g., CQI) fed back by the user equipment. Alternatively, when the user equipment sends NACK information, the user equipment also feeds back a reception quality information based on a prescribed reference signal or an MCS value information desired by the user equipment, thereby enabling the base station to measure a variation of the reception quality information. In this case, the user equipment simultaneously feed back a CQI matching a most robust path and a CQI matching a second-best path, thereby enabling a stable MCS configuration to prepare for a rapid path change.

<Second Embodiment>

According to a second embodiment of the present invention, as a detailed implementing method, proposed is a method of preferentially finding a type-1 PMI from a codebook without channel regeneration and then finding a type-2 PMI from the rest of candidates by excluding all PMIs including a type-1 PMI.

Namely, the user equipment selects a PMI, which maximizes channel capacity, from a codebook $\{P_1, P_2, P_3, \ldots, P_L\}$ using a channel H. The selected PMI is a type 1 PMI, and it is highly probable that a rank-1 PMI may be derived from a channel for Los path. The reason for this is that the Los channel itself has difficulty in establishing a parallel channel over rank-2.

FIG. 9 shows one example of selecting type-1 PMI and type-2 PMI from an existing codebook according to an embodiment of the present invention. Generally, a codebook consists of PMIs of rank 1 to rank $N_s$. Yet, in FIG. 9, for clarity, assume a case that $N_s$ is 4.

Referring to FIG. 9, first of all, a type-1 PMI for providing a biggest channel gain is derived, like Formula 23, from a codebook P1 ... P4 of rank=1. Of course, the type- 1 PMI is the PMI that maximizes channel capacity on Los path.

$$G_1 = \arg\max_{i=1,\ldots,4} \|HP_i\| \qquad \text{[Formula 23]}$$

Subsequently, all PMIs containing the type-1 PMI are excluded. When the type-1 PMI selected according to Formula 23 is set to $P_1$, a type-2 PMI index is derived like Formula 24.

$$G_2 = \arg\max_{i \in \{2,3,4,8,9,10,14\}} \|HP_i\| \qquad \text{[Formula 24]}$$

Namely, if the type-1 PMI is P1, PMIs in a region containing a precoding vector $w_0^{(1)}$ in FIG. 9 are excluded and a type-2 PMI is derived from P2, P3 P4, P8, P9 and P10 in the rest of blue region. A user equipment feeds back the type-1 PMI and the type-2 PMI obtained through such a process to a base station. And, the base station performs beamforming adaptive to a rapid shadowing change occurring situation using the two PMI informations.

Meanwhile, in case that a type-1 PMI of a channel is equal to or higher than rank 2, the user equipment excludes all PMIs containing a vector corresponding to the type- 1 PMI and is then able to find a type-2 PMI from the rest of candidates. The reason for this is that, since it is unable to know which one of type-1 PMI vectors is Los, vectors of the type-1 PMI are preferably excluded from all PMIs.

Meanwhile, in LTE (Long Term Evolution) system, in order to CQI (Channel Quality Information) calculation complexity, nested property is applied to a codebook design. The nested property means a structure in which a low-rank codebook becomes a subset of a high-rank codebook.

Table 3 shows a rank-4 codebook in LTE system.

TABLE 3

| Codebook index | $u_0$ | Number of layers v | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(134)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

Such a codebook is characterized in that columns in a codebook group are orthogonal to each other. For instance, if a codebook of a codebook index 0 shown in Table 3 is generated, it follows Formula 25. Referring to Formula 25, orthogonality ($W_0 W_0^H = I$) is established between the respective columns.

$$W_0 = I - 2u_0 u_0^H / u_0^H u_0 = \begin{bmatrix} 0.5 & 0.5 & 0.5 & 0.5 \\ 0.5 & 0.5 & -0.5 & -0.5 \\ 0.5 & -0.5 & 0.5 & -0.5 \\ 0.5 & -0.5 & -0.5 & 0.5 \end{bmatrix} \qquad \text{[Formula 25]}$$

FIG. 10 shows one example of deriving type-1 PMI and type-2 PMI from a codebook of a nested structure according to an embodiment of the present invention.

Referring to FIG. 10, a best PMI in a codebook is selected as a type-1 PMI for a channel H, and a PMI containing a vector/column of the type-1 PMI is excluded from the codebook. Thereafter, it can be observed that a best PMI is selected as a type-2 PPMI from the rest of the type-1 PMI eliminated codebook.

<Third Embodiment>

According to a third embodiment of the present invention, a user equipment is proposed to preferentially find a type-1 PMI from an existing codebook without channel regeneration and then find a type-2 PMI from next-higher rank candidates containing the type-1 PMI.

FIG. 11 shows another example of selecting type-1 PMI and type-2 PMI from an existing codebook according to an embodiment of the present invention. Generally, a codebook consists of PMIs of rank 1 to rank $N_s$. Yet, in FIG. 11, for clarity, assume a case that $N_s$ is 4.

Referring to FIG. 11, first of all, a user equipment selects a PMI, which provides a biggest channel gain, as a type-1 PMI from a codebook $\{P_1, P_2, P_3, \ldots, P_L\}$ according to Formula 26 using a channel H. Of course, the type-1 PMI is a PMI that maximizes channel capacity on Los path.

$$G_1 = \arg\max_{i=1,\ldots,4} \|HP_i\| \quad \text{[Formula 26]}$$

Thereafter, all PMIs containing the type-1 PMI are selected. In this case, a type-2 PMI is derived from a next-higher rank codebook containing the derived type-1 PMI according to Formula 27.

$$G_2 = \arg\max_{i \in \{5,6,7,11,12,13,15\}} \|HP_i\| \quad \text{[Formula 27]}$$

For instance, if the type-1 PMI is denoted by P1, the type-2 PMI is derived from P5, P6 P7, P11, P12, P13 and P15 included in a region over rank 2 among regions containing the precoding vector $w_0^{(1)}$ in FIG. 11.

The user equipment may feed back the type-2 PMI found in the above process to a base station. Alternatively, the user equipment selects a PMI, which results from eliminating a precoding vector corresponding to the type-1 PMI from the type-2 PMI, as a final PMI and then feeds back the final PMI. For instance, if P11 is selected as the type-2 PMI, P8 corresponding to a rank-2 matrix $\lfloor w_0^{(2)} w_0^{(3)} \rfloor$ resulting from eliminating $w_0^{(1)}$ from $\lfloor w_0^{(1)} w_0^{(2)} w_0^{(3)} \rfloor$ is selected as a final type-2 PMI and then fed back. In case that the type-1 PMI is over rank 2, the same process is performed.

Meanwhile, preferably, when a base station performs beamforming using a type-2 PMI, a precoding vector corresponding to a type-1 PMI is excluded from the corresponding PMI vector and then the corresponding PMI vector is used.

In addition, the third embodiment of the present invention is also applicable to a codebook of a nested structure. FIG. 12 shows another example of deriving type-1 PMI and type-2 PMI from a codebook of a nested structure according to an embodiment of the present invention.

Referring to FIG. 12, a best PMI is selected as a type-1 PMI from a codebook for channel H. Thereafter, it can be observed that a best PMI is selected as a type-2 PMI from a higher-rank codebook containing the type-1 PMI.

Figure 13:
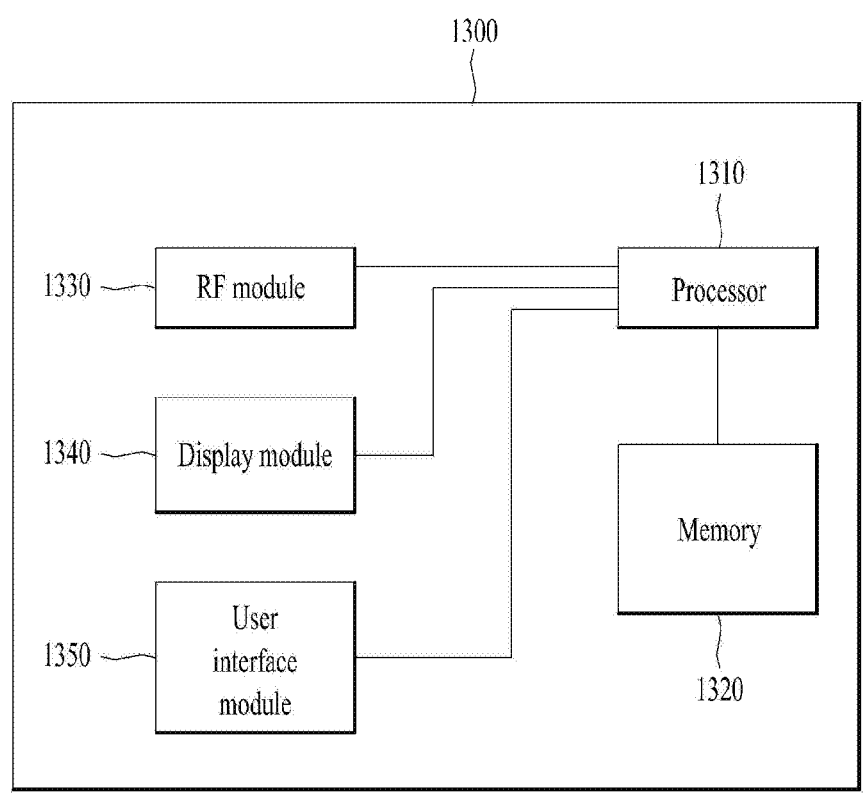
FIG. 13 is a block diagram of a communication apparatus according to one embodiment of the present invention.

FIG. 13 is a block diagram of a communication apparatus according to one embodiment of the present invention.

Referring to FIG. 13, a communication apparatus 1300 includes a processor 1310, a memory 1320, a Radio Frequency (RF) module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present invention described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of reporting a precoding matrix index to a base station (BS) in a wireless communication system, the method performed a user equipment and comprising:

estimating a channel with the BS;

selecting a first precoding matrix including at least one vector from a first codebook based on the estimated channel;

selecting a second precoding matrix from a second codebook based on the estimated channel; and reporting an index of the selected first precoding matrix and an index of the selected second precoding matrix to the BS, wherein the second codebook is defined by excluding one or more precoding matrixes from the first codebook, and wherein the one or more excluded precoding matrixes includes the at least one vector.

2. The method of claim 1, wherein the first precoding matrix is provided for a rank-1 transmission.

3. The method of claim 1, wherein:

the first precoding matrix is provided for a Line of Sight (LoS) path of the estimated channel; and the second precoding matrix is provided for a Non-LoS (NLos) path of the estimated channel.

4. The method of claim 1, wherein selecting the first precoding matrix and selecting the second precoding matrix comprises selecting a precoding matrix that maximizes capacity of the estimated channel.

5. The method of claim 1, further comprising receiving a signal from the BS, the signal encoded using the second precoding matrix by applying precoding by excluding the first precoding matrix from the second precoding matrix.

6. The method of claim 1, wherein a rank of the received signal determined by subtracting a rank corresponding to the first precoding matrix from a rank corresponding to the second precoding matrix.

* * * * *